United States Patent
Santiago et al.

(10) Patent No.: US 11,577,617 B2
(45) Date of Patent: Feb. 14, 2023

(54) DYNAMIC SAFE STATE CONTROL OF ELECTRICAL MOTOR BASED ON VEHICLE SPEED

(71) Applicant: NXP USA, Inc., Austin, TX (US)

(72) Inventors: Erik Santiago, La Tour du Crieu (FR); Jean-Christophe Patrick Rince, Roques (FR); Antoine Fabien Dubois, Austin, TX (US); Maxime Clairet, Labastidette (FR); Jean-Philippe Meunier, Ayguesvives (FR)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 17/205,010

(22) Filed: Mar. 18, 2021

(65) Prior Publication Data

US 2021/0331591 A1 Oct. 28, 2021

(30) Foreign Application Priority Data

Apr. 22, 2020 (EP) .................................... 20305393

(51) Int. Cl.
*G05B 5/00* (2006.01)
*B60L 15/20* (2006.01)
*H02P 27/06* (2006.01)

(52) U.S. Cl.
CPC .............. *B60L 15/20* (2013.01); *H02P 27/06* (2013.01)

(58) Field of Classification Search
CPC ........ H02P 29/02; H02P 29/028; H02P 27/06; B60L 15/20; G05B 19/0428
See application file for complete search history.

(56) References Cited

U.S. PATENT DOCUMENTS

| 5,825,708 | A | 10/1998 | Bennett |
| 9,673,744 | B2 | 6/2017 | Eberlein et al. |
| 2011/0089875 | A1 | 4/2011 | Patel et al. |
| 2014/0191700 | A1 | 7/2014 | Eberlein et al. |
| 2017/0155350 | A1 | 6/2017 | Jojima |
| 2018/0208236 | A1 | 7/2018 | Asao et al. |
| 2019/0144032 | A1 | 5/2019 | Cockerham |
| 2020/0328660 | A1* | 10/2020 | Guo ...................... B60L 3/0084 |

FOREIGN PATENT DOCUMENTS

| DE | 10127056 A1 * | 12/2002 | ............. F02D 41/22 |
| DE | 102020203965 A1 * | 9/2021 | |
| EP | 2779416 | 9/2014 | |
| EP | 2779416 | 1/2018 | |
| WO | WO-2020184299 A1 * | 9/2020 | .............. B60L 15/20 |

OTHER PUBLICATIONS

Reinhofer, Stephan, BSc.; "Fail Operational Architectures for Electric Propulsion Systems"; Master's Thesis submitted to Graz University of Technology; Nov. 2015; 81 pages.
U.S. Appl. No. 17/021,264, filed Sep. 15, 2020, 33 pages.

* cited by examiner

*Primary Examiner* — Karen Masih (57) ABSTRACT

A dynamic safe state control circuit is disclosed that controls an electrical motor based on vehicle speed. A microcontroller or other processing device is configured to control an inverter system of an electrical motor. The dynamic safe state control circuit is configured to receive a first signal that corresponds to a speed of the electric motor. The circuit is configured to activate any one of a plurality of safe states in the inverter system based on the first signal and in response to a malfunction in the microcontroller.

17 Claims, 4 Drawing Sheets

DYNAMIC SAFE STATE CONTROL OF ELECTRICAL MOTOR BASED ON VEHICLE SPEED

BACKGROUND

An electrical motor is a machine that converts electrical energy into mechanical energy. Electrical motors are employed in electric vehicles (EVs) and generate mechanical force through an interaction between a magnetic field and electric current in wire windings. The force is used to rotate a drive shaft, which in turn propels the EV. Electrical motors vary in design. Some are powered by direct current (DC) sources (e.g., batteries), while others powered by alternating current (AC) sources (e.g., the electrical grid). Electrical motors may be brushed or brushless. Electrical motors can be designed with one or more phases. The present disclosure will be described with reference to a three-phased electrical motor powered by a battery, it being understood the present disclosure should not be limited thereto. Moreover, the present disclosure will be described with reference to an electrical motor employed in an electric vehicle (EV), it being understood that present disclosure should not be limited thereto.

SUMMARY

Aspects of the disclosure are defined in the accompanying claims. In a first aspect, there is provided an apparatus comprising an inverter system, a microcontroller for controlling the inverter system, and an integrated circuit (IC) coupled to the inverter system. The IC is configured to receive an error signal from the microcontroller, and a first signal that corresponds to a speed of a vehicle. In response to an assertion of the error signal, the IC can activate any one of a plurality of safe states for the inverter system based on the first signal.

In one or more embodiments, the IC may be configured to convert the first signal into a first value, the IC may be configured to compare the first value with a second value, the IC may be configured to activate a first safe state of the plurality of safe states for the inverter if the first value exceeds the second value, the IC may be configured to activate a second safe state of the plurality of safe states for the inverter if the second value exceeds the first value.

In one or more embodiments, the IC may lack a central processing unit.

In one or more embodiments, the inverter may comprise: a plurality of first transistors coupled between a supply voltage terminal and a plurality wire windings, respectively, a plurality of first circuits configured to selectively activate the plurality of first transistors, respectively; a plurality of second transistors coupled between the plurality wire windings, respectively, and a ground return, a plurality of second circuits configured to selectively activate the plurality of second transistors, respectively; wherein the microcontroller may be coupled to and configured to control the plurality of first and second circuits.

In one or more embodiments, the IC may assert an enable signal that is received by each of the first and second circuits in response to the microcontroller asserting the error signal; the IC may assert a first control signal that is received by each of the first circuits when the microcontroller asserts the error signal and when the first value exceeds the second value; the IC may de-assert a second control signal that is received by each of the second circuits when the microcontroller asserts the error signal and when the first value exceeds the second value; the first circuits may activate the first transistors, respectively, in response to the assertion of the enable signal and the assertion of the first control signal; the second circuits may deactivate the second transistors, respectively, in response to the assertion of the enable signal and the de-assertion of the second control signal.

In one or more embodiments, the IC may assert an enable signal that is received by each of the first and second circuits in response to the microcontroller asserting the error signal; the IC may de-asserts a first control signal that is received by each of the first circuits when the microcontroller asserts the error signal and when the first value exceeds the second value; the IC may asserts a second control signal that is received by each of the second circuits when the microcontroller asserts the error signal and when the first value exceeds the second value; the first circuits may de-activate the first transistors, respectively, in response to the assertion of the enable signal and the de-assertion of the first control signal; the second circuits may activate the second transistors, respectively, in response to the assertion of the enable signal and the de-assertion of the second control signal.

In one or more embodiments, the IC may asserts an enable signal that is received by each of the first and second circuits in response to the microcontroller asserting the error signal; the IC may de-assert a first control signal that is received by each of the first circuits in response to the microcontroller asserting the error signal and when the second value exceeds the first value; the IC may de-assert a second control signal that is received by each of the second circuits in response to the microcontroller asserting the error signal and when the second value exceeds first value; the first circuits may de-activate the first transistors, respectively, in response to the assertion of the enable signal and the de-assertion of the first control signal; the second circuits may deactivate the second transistors, respectively, in response to the assertion of the enable signal and the de-assertion of the second control signal.

In one or more embodiments, the inverter may comprise: a plurality of first transistors coupled between a supply voltage terminal and a plurality wire windings, respectively, a plurality of first circuits configured to selectively activate the plurality of first transistors, respectively; a plurality of second transistors coupled between the plurality wire windings, respectively, and a ground return; a plurality of second circuits configured to selectively activate the plurality of second transistors, respectively; wherein the first transistors may be activated and the second transistors may be deactivated in response to the IC asserting the first state; wherein the first transistors and the second transistors may be deactivated in response to the IC asserting the second state.

In a second aspect, there is provided a method comprising: an integrated circuit (IC) receiving an asserted error signal from a microcontroller, wherein the microcontroller is configured to control an inverter system of an electrical motor; the IC receiving a first signal that corresponds to a speed of a vehicle that comprises the electrical motor; the IC converting the first signal into a first value; the IC comparing the first value with a second value; the IC activating a first safe state for the inverter if the first value exceeds the second value; the IC activating a second safe state for the inverter if the second value exceeds the first value.

In one or more embodiments, the inverter may comprise: a plurality of first transistors coupled between a battery and a plurality wire windings, respectively, of the electrical motor; a plurality of second transistors coupled between the plurality wire windings, respectively, and a ground return for the battery; wherein the first transistors may be activated and the second transistors may be deactivated when the inverter is in the first safe state; wherein the first and second transistors may be deactivated when the inverter is in the second safe state.

In one or more embodiments, the inverter may comprise: a plurality of first transistors coupled between a battery and a plurality wire windings, respectively, of the electrical motor; a plurality of second transistors coupled between the plurality wire windings, respectively, and a ground return for the battery; wherein the second transistors may be activated and the first transistors may be deactivated when the inverter is in the first safe state; wherein the first and second transistors may be deactivated when the inverter is in the second safe state.

In one or more embodiments, the IC may activate the first safe state before the IC activates the second safe state.

In one or more embodiments, the method may further comprise the microcontroller asserting the error signal in response to a hardware or software malfunction in the microcontroller.

In a third aspect, there is provided an apparatus comprising a microcontroller configured to control an inverter system, and a circuit configured to receive a first signal that corresponds to a speed of an electric motor, wherein the circuit is configured to activate any one of a plurality of safe states in the inverter system based on the first signal and in response to a malfunction in the microcontroller.

In one or more embodiments, the apparatus may further comprise the inverter, which in turn comprises: a plurality of first transistors coupled between a supply voltage terminal and a plurality wire windings, respectively, a plurality of first circuits configured to selectively activate the plurality of first transistors, respectively; a plurality of second transistors coupled between the plurality wire windings, respectively, and a ground return, a plurality of second circuits configured to selectively activate the plurality of second transistors, respectively; wherein the microcontroller may be coupled to and configured to control the plurality of first and second circuits.

In one or more embodiments, the circuit may be configured to convert the first signal into a first value; the circuit may be configured to compare the first value with a second value; the circuit may be configured to activate a first safe state of the plurality of safe states for the inverter if the first value exceeds the second value; the circuit may be configured to activate a second safe state of the plurality of safe states for the inverter if the second value exceeds the first value.

In one or more embodiments, the microcontroller may be configured to assert an error signal in response to the microcontroller malfunction; the circuit may assert a first control signal that is received by each of the first circuits in response to the microcontroller asserting the error signal and when the first value exceeds the second value; the circuit may de-assert a second control signal that is received by each of the second circuits in response to the microcontroller asserting the error signal and when the first value exceeds the second value; the circuit may assert an enable signal that is received by each of the first and second circuits in response to the microcontroller asserting the error signal and in response to the circuit asserting the first control signal and de-asserting the second control signal; the first circuits may activate the first transistors, respectively, in response to the assertion of the enable signal and the assertion of the first control signal; the second circuits may deactivate the second transistors, respectively, in response to the assertion of the enable signal and the de-assertion of the second control signal.

In one or more embodiments, the microcontroller may be configured to assert an error signal in response to the microcontroller malfunction; the circuit may de-assert a first control signal that is received by each of the first circuits in response to the microcontroller asserting the error signal and when the first value exceeds the second value; the circuit may assert a second control signal that is received by each of the second circuits in response to the microcontroller asserting the error signal and when the first value exceeds the second value; the circuit may assert an enable signal that is received by each of the first and second circuits in response to the microcontroller asserting the error signal and in response to the circuit asserting the second control signal and de-asserting the first control signal; the first circuits may deactivate the first transistors, respectively, in response to the assertion of the enable signal and the de-assertion of the first control signal; the second circuits may activate the second transistors, respectively, in response to the assertion of the enable signal and the assertion of the second control signal.

In one or more embodiments, the microcontroller may be configured to assert an error signal in response to the microcontroller malfunction; the circuit may de-assert a first control signal that is received by each of the first circuits in response to the microcontroller asserting the error signal and when the second value exceeds the first value; the circuit may de-asserts a second control signal that is received by each of the second circuits in response to the microcontroller asserting the error signal and when the second value exceeds the first value; the circuit may assert an enable signal that is received by each of the first and second circuits in response to the microcontroller asserting the error signal and in response to the circuit de-asserting the first and second control signals; the first circuits may deactivate the first transistors, respectively, in response to the assertion of the enable signal and the de-assertion of the first control signal; the second circuits may deactivate the second transistors, respectively, in response to the assertion of the enable signal and the de-assertion of the second control signal.

BRIEF DESCRIPTION OF THE DRAWINGS

It will be appreciated that for simplicity and clarity of illustration, elements illustrated in the figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION

Microcontrollers or other data processing devices (e.g., system on a chip) are commonly used to control the operation of electrical motors via inverter systems. In basic terms, an inverter system is an electronic device that changes DC power to AC power for use by the motor. Microcontrollers can monitor for faults or dangerous conditions in the inverter or other components of the electrical motor. As will be more fully described below, if the microcontroller detects a dangerous condition or fault, the microcontroller can select and activate a safe state that, for example, isolates the inverter from the battery.

Figure 1:
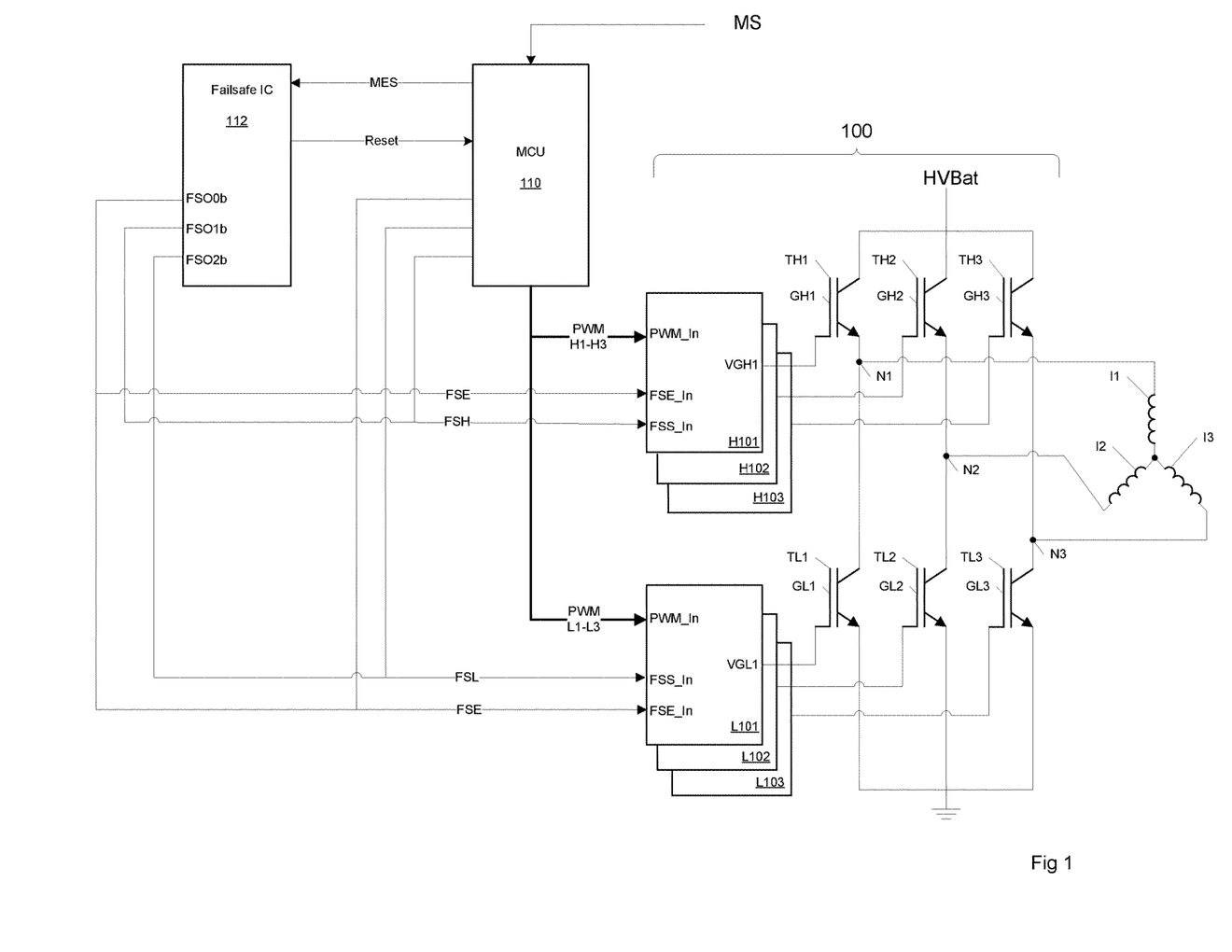
FIG. 1 shows relevant components of an example electrical motor for an EV.

FIG. 1 shows relevant components of an example electrical motor for an EV. The motor includes a microcontroller 110 that can control an example three phase, pulse-width modulation (PWM) inverter system 100. As shown inverter system 100 includes high side power transistors TH1-TH3 connected in series with low side power transistors TL1-TL3, respectively, via terminal nodes N1-N3, respectively, which in turn are connected to wire windings L1-L3, respectively. For purposes of explanation only, power transistors TH1-TH3 and TL1-TL3 take form in insulated-gate bipolar transistors (IGBTs), it being understood the term power transistor should not be limited thereto. The collectors of high side transistors TH1-TH3 are connected to a DC supply voltage HVBat (e.g., 12V, 48V, 1 kV, etc.) that is directly or indirectly provided by a battery (not shown), while the emitters of low side transistors TL1-TL3 are connected to a ground return.

Figure 2:
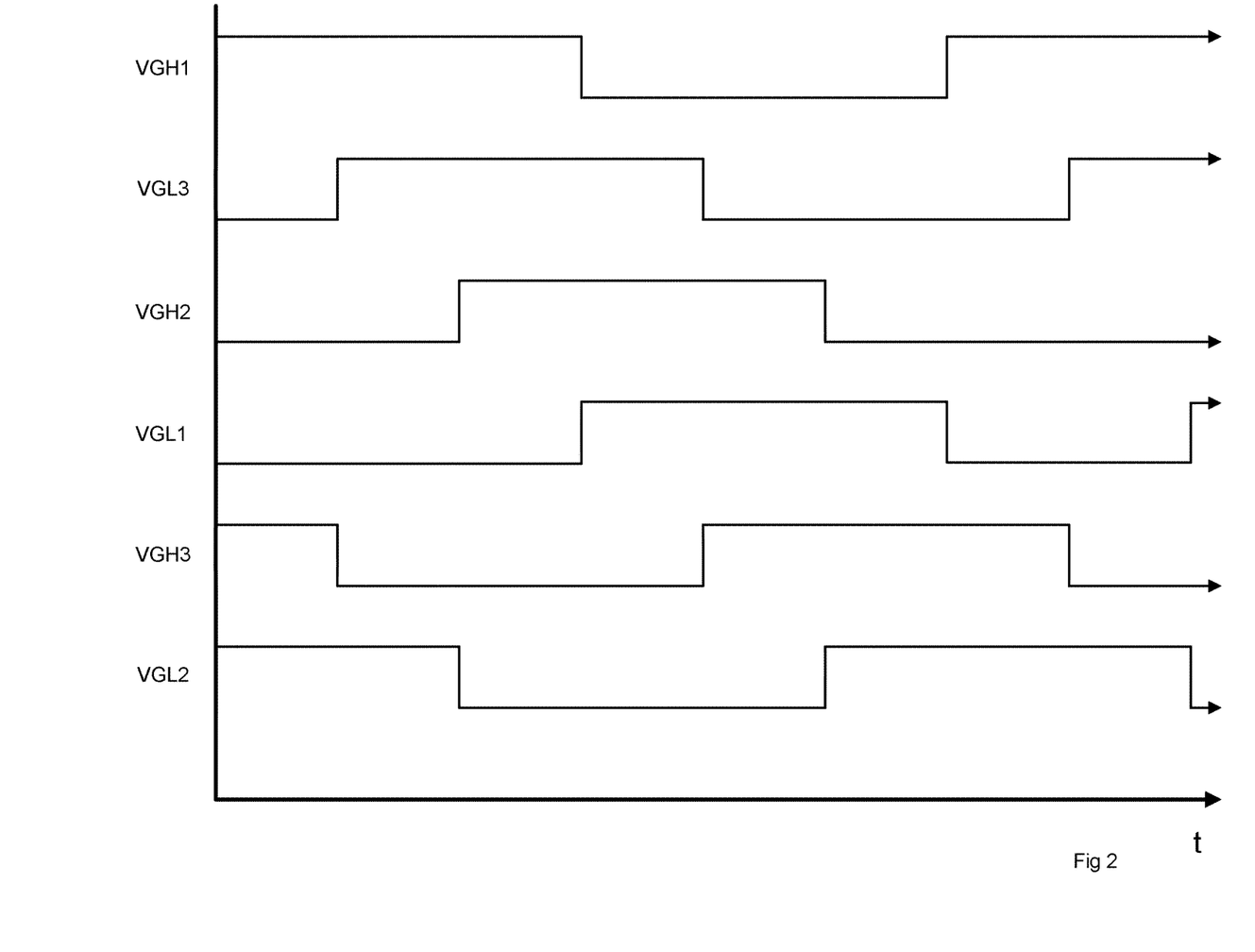
FIG. 2 is a timing diagram illustrating example control signals applied to the transistors of FIG. 1.

Inverter system 100 control is relatively simple. High side gate drivers H101-H103 and low side gate drivers L101-L103 receive control signals (i.e., pulse width modulation signals PWM-H1-PWM-H3 and PWM-L1-PWM-L3) from microcontroller 110 at respective inputs PWM_In. In response to the control signals, high side gate drivers H101-H103 selectively activate high side transistors TH1-TH3, respectively, via gate control voltages VGH1-VGH3, respectively, and low side gate drivers L101-L103 selectively activate low side transistors TL1-TL3, respectively, via gate control voltages VGL1-VGL3, respectively. If functioning properly, each of the power transistors should conduct current to or from a corresponding winding when activated by its corresponding gate driver. Through coordinated activation of the high side and low side transistors, the direction of the current is continuously and regularly flip-flopped (current travels into a winding, then abruptly reverses and flows back out). FIG. 2 illustrate a timing diagram for example control voltages VGH1-VGH3 and VGL1-VGL3, and the coordination thereof. The interaction between a magnetic field of a rotor, which is coupled to a drive shaft, and electric current in wire windings L1-L3 creates rotational force that propels the EV.

Microcontroller 110 is a compact integrated circuit. Although not shown, microcontroller 110 includes a central processing unit (CPU), memory, and peripherals such as timers, input/output (I/O) ports, etc., on a single chip. The CPU can program the timers in accordance with software executing on the CPU. Once programmed and started, these timers can autonomously generate PWM signals PWM-H1-PWM-H3 for output to gate drivers H101-H10, respectively, and PWM signals PWM-L1-PWM-L3 for output to gate drivers L101-L10, respectively. Gate drivers H101-H103 generate gate control voltages VGH1-VGH3 based on PWM signals PWM-H1-PWM-H3, and gate drivers L101-L103 generate gate control voltages VGL1-VLH3 based on PWM signals PWM-L1-PWM-L3. The CPU may reprogram the timers in order to adjust duty cycle and period of the PWM signals, which in turn adjusts the rotational speed of the EV's drive shaft.

Returning back to inverter system 100, each of the gate drivers H101-H103 and L101-L103 has an input FSE_In for receiving a failsafe enable (FSE) signal. Additionally, each of the gate drivers H101-H103 and L101-L103 has an input FSS_In for receiving a failsafe high (FSH) signal or a failsafe low (FSL) signal. In response to the assertion of FSE signal, gate drivers H101-H103 and L101-L103 will ignore the signal received at PWM_In in favor of the signal received at FSS_In. In response to the assertion of the FSH or the FSL signals, gate drivers H101-H103 or L101-L103, respectively, will activate their respective power transistors thereby shorting the collector and emitters thereof. In response to not asserting (de-asserting) the FSH or the FSL signals, gate drivers H101-H103 or L101-L103, respectively, will deactivate their respective power transistors thereby creating an open between the collector and emitters thereof.

Inverter systems and other components of the electrical motor are susceptible to faults or failures. Each of the gate drivers H101-H103 and L101-L103 can detect internal or external electrical failures or faults. If a gate driver detects a fault or failure, it can assert an error signal (not shown). For example, gate driver H101 may monitor the voltage at terminal node N1, which should be HVBat only when TH1 is activated by gate driver H101. If gate driver H101 detects a voltage (i.e. HVBat) at N1 when transistor TH1 is deactivated, then a short circuit is presumed to exist between TH1's collector and emitter, and gate driver H101 will assert its error signal. Gate driver H101 may also monitor the voltage across a sense resistor (not shown) that is strategically placed in the conductive path between HVBat and TH1's collector. Current should flow through the sense resistor when TH1 is activated by gate driver H101. If no voltage is detected across the sense resistor by gate driver H101 when transistor TH1 is activated, then an open circuit is presumed to exist. If this condition is detected, gate driver H101 can assert its error signal. Gate driver H101 may detect an internal failure, which could lead to failure to activate TH1. If this condition is detected, gate driver H101 can assert its error signal. Other faults or failures are contemplated.

Microcontroller 110 receives error signals from the gate drivers H101-H103 and L101-L103, and/or other components of the electrical motor. Additionally, microcontroller receives an input signal MS that represents the rotational speed of a wheel axle, drive shaft, rotor or other component, which in turn corresponds to the speed at which the EV is moving. The MS signal may take form in a PWM signal whose duty cycle is proportional to a rotational speed of an axle, rotor, etc. Alternatively, the MS signal may take form in a digital signal or an analog signal that represents the rotational speed of an axle, rotor, etc. The MS signal could be received from a system that is external to the electrical motor shown in FIG. 1, or the MS signal could be generated internal to the electrical motor. Microcontroller 110 can convert the MS signal into an EV speed value that can be compared with a predetermined threshold value TH stored in memory. In one embodiment, the EV speed value and the threshold value can be digital values. When an error signal is received, microcontroller 110 can respond by selecting a safe state for inverter 100 based on any one or more of many factors, such as the EV speed, type of fault or failure (e.g., an electric short of a power transistor), location of the fault or failure (e.g., a low side power transistor in the inverter system), etc. To illustrate, microcontroller 110 may receive an error signal from a gate driver while the MS signal indicates the EV speed is above threshold TH. In response microcontroller 110 can select a first safe state, which is implemented by asserting the FSE and FSH signals and de-asserting the FSL signal. In response power transistors TH1-TH3 will activate and short each node N1-N3 to HVBat, while power transistors TL1-TL3 are deactivated and disconnect nodes N1-N3 from ground. Microcontroller 110, while continuing to monitor the EV speed via input signal MS, may subsequently place the motor in a second safe state by de-asserting FSH, which deactivates TH1-TH3 and disconnects nodes N1-N3 from HVBat after microcontroller 110 determines the EV speed is below threshold TH.

Unfortunately, microcontrollers can malfunction. When microcontroller 110 malfunctions, it may not be able to respond to an error signal it receives. Failsafe ICs are provided along with microcontrollers and act as safety backups thereto. If the microcontroller malfunctions, the failsafe IC, which is typically formed on a separate IC die, can step in and activate a safe state for the inverter. FIG. 1 shows a failsafe IC 112 that monitors the software and/or hardware operating conditions of microcontroller 110. More particularly IC 112 monitors at least one error signal MES from microcontroller 110. The MES signal, when asserted, indicates a software or hardware malfunction in the microcontroller 110. In one embodiment, microcontroller 110 may include a watchdog timer that is used to detect malfunctions. During normal operation, the microcontroller regularly resets the watchdog timer to prevent it from elapsing, or "timing out." If, due to a hardware fault or program error, microcontroller 110 fails to reset the watchdog timer, the timer will elapse, and error signal MES will be asserted. If the error signal MES is asserted, microcontroller 110 is presumed inoperable, and IC 112 activates a safe state for inverter system 100. While microcontroller 110 may be able to activate any one of a number of different safe states for inverter system 100, IC 112 activates only one safe state (hereinafter referred to as the "IC safe state"). Failsafe IC implements the IC safe state by asserting the FSE and FSL signals at outputs FSO0b and FSO2b outputs, and de-asserting the FSH signal at FSO1b output. In response high side gate drivers H101-H103 deactivate TH1-TH3, while low side gate drivers L101-L103 activate TL1-TL3. In the IC safe state, nodes N1-N3 should be connected to ground GND and isolated from HVBat. IC 112 places inverter system 100 into the IC safe state regardless of EV speed. Unfortunately, the IC safe state may induce torque braking on the drive shaft, and the torque braking may cause damage to the EV, injury to occupants of the EV, or other problems particularly if EV speed is high when the IC state is activated.

Figure 3:
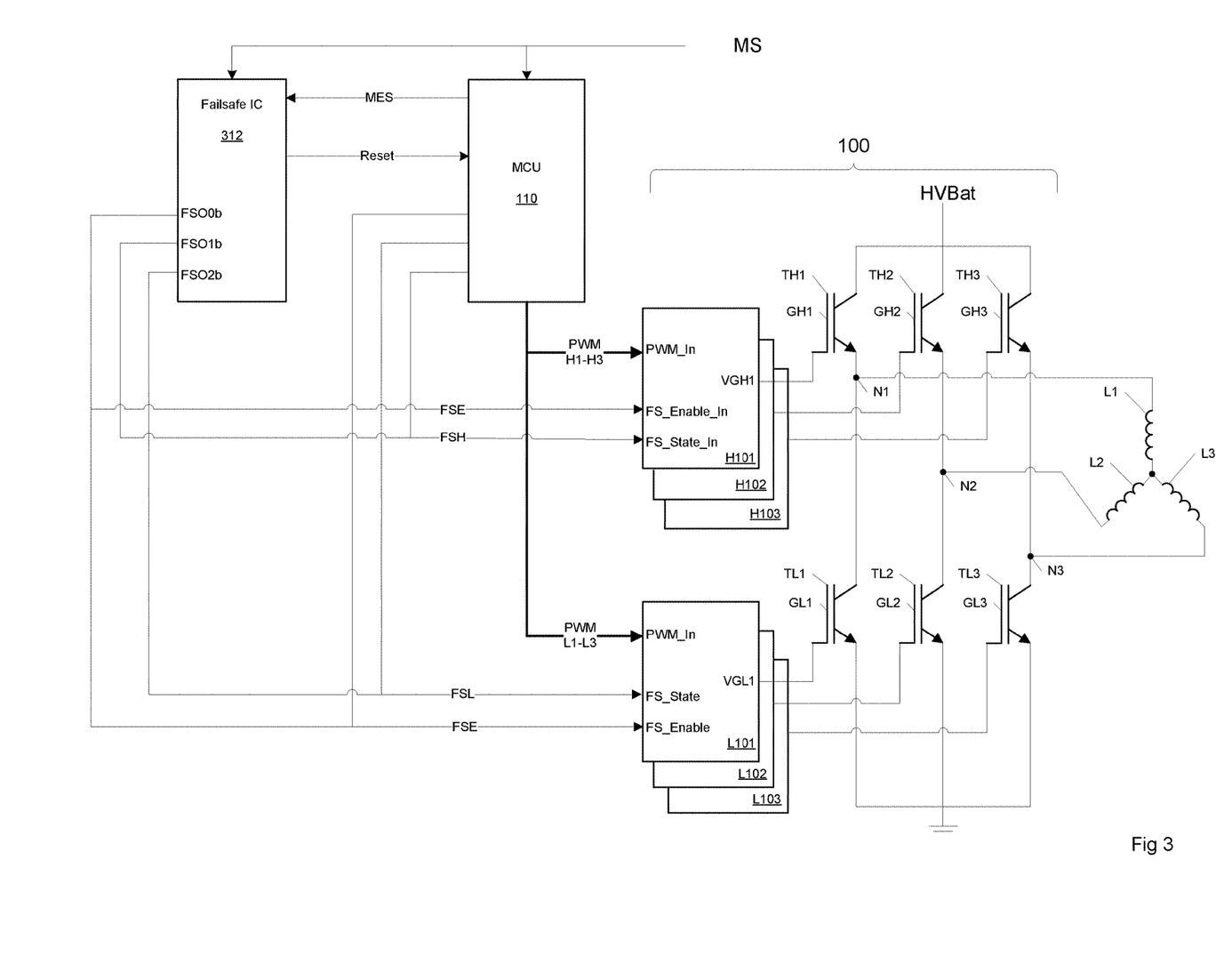
FIG. 3 shows relevant components of an example electrical motor for an EV, which employs one embodiment of the present disclosure.

FIG. 3 shows the system of FIG. 1, with failsafe IC 112 replaced by failsafe IC 312. Failsafe ICs 112 and 312 are substantially different in structure and function. In one embodiment, failsafe IC 312 is formed on a semiconductor die, and may include combinational logic that generate FSE, FSH, and FSL at outputs FSO0B, FSO1b, and FS02b, respectively. While failsafe IC 312 need not be limited to a combinational logic circuit, failsafe IC 312 is not a complex data processing device in that it lacks a CPU and memory storing instructions executable by a CPU. Unlike the failsafe IC 112 shown in FIG. 1, failsafe IC 312 receives the MS signal that can be converted into an instantaneous EV speed value. In an alternative embodiment, failsafe IC 312 may receive a signal other than MS, which can also be converted into instantaneous EV speed. The MS signal may take form in a PWM signal whose duty cycle is proportional to a rotational speed of an axle, rotor, etc. Alternatively, the MS signal may take form in a digital signal or an analog signal that represents the rotational speed of an axle, rotor, etc. The MS signal could be received from a system that is external to the electrical motor shown in FIG. 1, or the MS signal could be generated internal to the electrical motor. Failsafe IC 312 can convert the MS signal into an EV speed value that can be compared with a predetermined threshold value TH. As more fully below, failsafe IC 312 can place inverter system 100 in any one of multiple safe states based on the MS signal.

Figure 4:
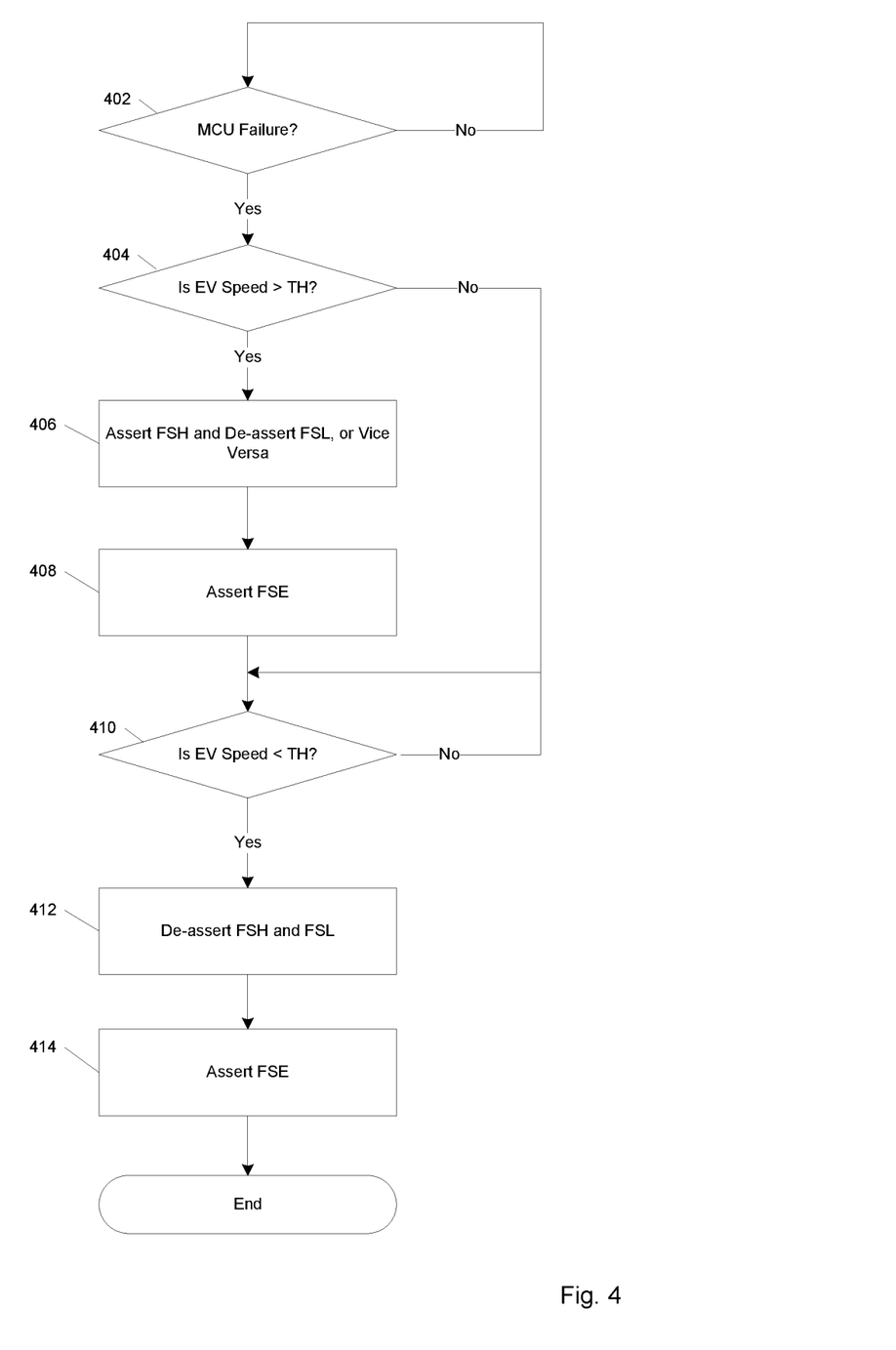
FIG. 4 is a flow chart illustrating relevant aspects of an example method employed by the failsafe circuit of FIG. 3.

Failsafe IC 312, like failsafe IC 112 monitors microcontroller 110. More particularly IC 312 monitors the MES signal from microcontroller 110. If the MES signal is asserted due to hardware or software failure, microcontroller 110 is presumed inoperable, and IC 312 dynamically activates a safe state for inverter system 100. FIG. 4 is an example process implemented by failsafe IC 312 in response to microcontroller 110 malfunction. In step 402 failsafe IC 312 detects microcontroller failure when microcontroller 110 asserts the MES signal. Thereafter, in step 404, failsafe IC 312 compares the instantaneous EV speed value it calculates against a threshold value TH, which is stored in configurable memory of the failsafe IC 312. In one embodiment, the configurable memory is read-only, and TH is predetermined based parameters of the electrical motor and/or the EV in which it is contained. If the EV speed value is determined by failsafe IC 312 to be greater than TH, then failsafe IC 312 asserts FSH and de-asserts FSL, or vice versa, in step 406. Thereafter failsafe IC 312 asserts FSE at its FSO0b output, which is connected to each FSE_In input of gate drivers H101-H103 and L101-L103. In response to FSE assertion, the gate drivers will ignore control signals at inputs PWM_In, and respond to the FSH and FSL output signals of IC 312. After step 408, or in response to a determination by failsafe IC 312 that the EV speed value is less than threshold TH in step 404, the process proceeds to step 410 where failsafe IC 312 continuously compares the threshold TH against the EV speed value as it changes. If the speed is found to be less than threshold TH, failsafe IC 312 de-asserts both FSH and FSL in step 412. Thereafter, IC 312 will assert FSE if it is not already asserted. It is noted that IC 312 can subsequently de-assert FSE, and send a reset signal to microcontroller if the MES signal is de-asserted.

A dynamic safe state control circuit is disclosed that controls an electrical motor based on vehicle speed. A microcontroller or other processing device is configured to control an inverter system of an electrical motor. The dynamic safe state control circuit is configured to receive a first signal that corresponds to a speed of the electric motor. The circuit is configured to activate any one of a plurality of safe states in the inverter system based on the first signal and in response to a malfunction in the microcontroller.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:
1. An integrated circuit (IC):
  wherein the integrated circuit (IC) is configured to be coupled to an inverter having a microcontroller;
  wherein the IC is configured to receive an error signal from the microcontroller, and a first signal that corresponds to a speed of a vehicle;

wherein, in response to an assertion of the error signal, the IC can activate any one of a plurality of safe states for the inverter based on the first signal;
wherein the IC is configured to convert the first signal into a first value;
wherein the IC is configured to compare the first value with a second value;
wherein the IC is configured to activate a first safe state of the plurality of safe states for the inverter if the first value exceeds the second value; and
wherein the IC is configured to activate a second safe state of the plurality of safe states for the inverter if the second value exceeds the first value.

2. The IC of claim 1:
wherein the IC is a combinational logic circuit.

3. The IC of claim 1:
wherein the inverter comprises,
  a plurality of first transistors coupled between a supply voltage terminal and a plurality wire windings, respectively,
  a plurality of first circuits configured to selectively activate the plurality of first transistors, respectively;
  a plurality of second transistors coupled between the plurality wire windings, respectively, and
  a ground return,
  a plurality of second circuits configured to selectively activate the plurality of second transistors, respectively;
wherein the microcontroller is coupled to and configured to control the plurality of first and second circuits.

4. The IC of claim 3:
wherein the IC asserts an enable signal that is received by each of the first and second circuits in response to the microcontroller asserting the error signal;
wherein the IC asserts a first control signal that is received by each of the first circuits when the microcontroller asserts the error signal and when the first value exceeds the second value;
wherein the IC de-asserts a second control signal that is received by each of the second circuits when the microcontroller asserts the error signal and when the first value exceeds the second value;
wherein the first circuits activate the first transistors, respectively, in response to the assertion of the enable signal and the assertion of the first control signal;
wherein the second circuits deactivate the second transistors, respectively, in response to the assertion of the enable signal and the de-assertion of the second control signal.

5. The IC of claim 3:
wherein the IC asserts an enable signal that is received by each of the first and second circuits in response to the microcontroller asserting the error signal;
wherein the IC de-asserts a first control signal that is received by each of the first circuits when the microcontroller asserts the error signal and when the first value exceeds the second value;
wherein the IC asserts a second control signal that is received by each of the second circuits when the microcontroller asserts the error signal and when the first value exceeds the second value;
wherein the first circuits de-activate the first transistors, respectively, in response to the assertion of the enable signal and the de-assertion of the first control signal;
wherein the second circuits activate the second transistors, respectively, in response to the assertion of the enable signal and the de-assertion of the second control signal.

6. The IC of claim 3:
wherein the IC asserts an enable signal that is received by each of the first and second circuits in response to the microcontroller asserting the error signal;
wherein the IC de-asserts a first control signal that is received by each of the first circuits in response to the microcontroller asserting the error signal and when the second value exceeds the first value;
wherein the IC de-asserts a second control signal that is received by each of the second circuits in response to the microcontroller asserting the error signal and when the second value exceeds first value;
wherein the first circuits de-activate the first transistors, respectively, in response to the assertion of the enable signal and the de-assertion of the first control signal;
wherein the second circuits deactivate the second transistors, respectively, in response to the assertion of the enable signal and the de-assertion of the second control signal.

7. The IC of claim 1:
wherein the inverter comprises:
  a plurality of first transistors coupled between a supply voltage terminal and a plurality wire windings, respectively,
  a plurality of first circuits configured to selectively activate the plurality of first transistors, respectively;
  a plurality of second transistors coupled between the plurality wire windings, respectively, and
  a ground return;
  a plurality of second circuits configured to selectively activate the plurality of second transistors, respectively;
wherein the first transistors are activated and the second transistors are deactivated in response to the IC asserting the first state;
wherein the first transistors and the second transistors are deactivated in response to the IC asserting the second state.

8. A method comprising:
an integrated circuit (IC) receiving an asserted error signal from a microcontroller, wherein the microcontroller is configured to control an inverter system of an electrical motor;
the IC receiving a first signal that corresponds to a speed of a vehicle that comprises the electrical motor;
the IC converting the first signal into a first value;
the IC comparing the first value with a second value;
the IC activating a first safe state for the inverter if the first value exceeds the second value;
the IC activating a second safe state for the inverter if the second value exceeds the first value.

9. The method of claim 8:
wherein the inverter comprises:
  a plurality of first transistors coupled between a battery and a plurality of wire windings, respectively, of the electrical motor;
  a plurality of second transistors coupled between the plurality wire windings, respectively, and
  a ground return for the battery;
wherein the first transistors are activated and the second transistors are deactivated when the inverter is in the first safe state;

wherein the first and second transistors are deactivated when the inverter is in the second safe state.

10. The method of claim 8:
wherein the inverter comprises:
   a plurality of first transistors coupled between a battery and a plurality wire windings, respectively, of the electrical motor;
   a plurality of second transistors coupled between the plurality wire windings, respectively, and
   a ground return for the battery;
wherein the second transistors are activated and the first transistors are deactivated when the inverter is in the first safe state;
wherein the first and second transistors are deactivated when the inverter is in the second safe state.

11. The method of claim 8
wherein the IC activates the first safe state before the IC activates the second safe state.

12. The method of claim 8
further comprising the microcontroller asserting the error signal in response to a hardware or software malfunction in the microcontroller.

13. An apparatus comprising:
a microcontroller configured to control an inverter;
a circuit configured to receive a first signal that corresponds to a speed of an electric motor,
wherein the circuit is configured to activate any one of a plurality of safe states in the inverter based on the first signal and in response to a malfunction in the microcontroller;
wherein the circuit is configured to convert the first signal into a first value;
wherein the circuit is configured to compare the first value with a second value;
wherein the circuit is configured to activate a first safe state of the plurality of safe states for the inverter if the first value exceeds the second value; and
wherein the circuit is configured to activate a second safe state of the plurality of safe states for the inverter if the second value exceeds the first value.

14. The apparatus of claim 13 further comprising:
the inverter, which in turn comprises:
   a plurality of first transistors coupled between a supply voltage terminal and a plurality wire windings, respectively,
   a plurality of first circuits configured to selectively activate the plurality of first transistors, respectively;
   a plurality of second transistors coupled between the plurality wire windings, respectively, and
   a ground return,
a plurality of second circuits configured to selectively activate the plurality of second transistors, respectively;
wherein the microcontroller is coupled to and configured to control the plurality of first and second circuits.

15. The apparatus of claim 14:
wherein the microcontroller is configured to assert an error signal in response to the microcontroller malfunction;
wherein the circuit asserts a first control signal that is received by each of the first circuits in response to the microcontroller asserting the error signal and when the first value exceeds the second value;
wherein the circuit de-asserts a second control signal that is received by each of the second circuits in response to the microcontroller asserting the error signal and when the first value exceeds the second value;
wherein the circuit asserts an enable signal that is received by each of the first and second circuits in response to the microcontroller asserting the error signal and in response to the circuit asserting the first control signal and de-asserting the second control signal;
wherein the first circuits activate the first transistors, respectively, in response to the assertion of the enable signal and the assertion of the first control signal;
wherein the second circuits deactivate the second transistors, respectively, in response to the assertion of the enable signal and the de-assertion of the second control signal.

16. The apparatus of claim 14:
wherein the microcontroller is configured to assert an error signal in response to the microcontroller malfunction;
wherein the circuit de-asserts a first control signal that is received by each of the first circuits in response to the microcontroller asserting the error signal and when the first value exceeds the second value;
wherein the circuit asserts a second control signal that is received by each of the second circuits in response to the microcontroller asserting the error signal and when the first value exceeds the second value;
wherein the circuit asserts an enable signal that is received by each of the first and second circuits in response to the microcontroller asserting the error signal and in response to the circuit asserting the second control signal and de-asserting the first control signal;
wherein the first circuits deactivate the first transistors, respectively, in response to the assertion of the enable signal and the de-assertion of the first control signal;
wherein the second circuits activate the second transistors, respectively, in response to the assertion of the enable signal and the assertion of the second control signal.

17. The apparatus of claim 14:
wherein the microcontroller is configured to assert an error signal in response to the microcontroller malfunction;
wherein the circuit de-asserts a first control signal that is received by each of the first circuits in response to the microcontroller asserting the error signal and when the second value exceeds the first value;
wherein the circuit de-asserts a second control signal that is received by each of the second circuits in response to the microcontroller asserting the error signal and when the second value exceeds the first value;
wherein the circuit asserts an enable signal that is received by each of the first and second circuits in response to the microcontroller asserting the error signal and in response to the circuit de-asserting the first and second control signals;
wherein the first circuits deactivate the first transistors, respectively, in response to the assertion of the enable signal and the de-assertion of the first control signal;
wherein the second circuits deactivate the second transistors, respectively, in response to the assertion of the enable signal and the de-assertion of the second control signal.

* * * * *